Figure 1:
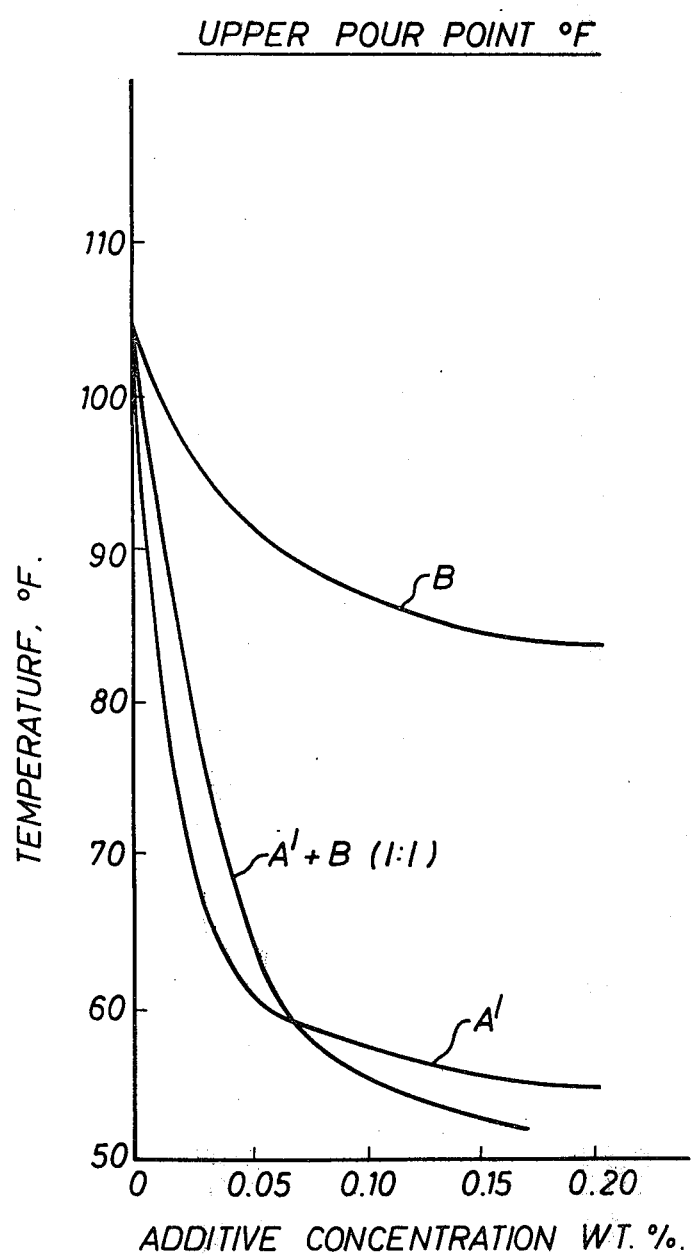
Figure 2:
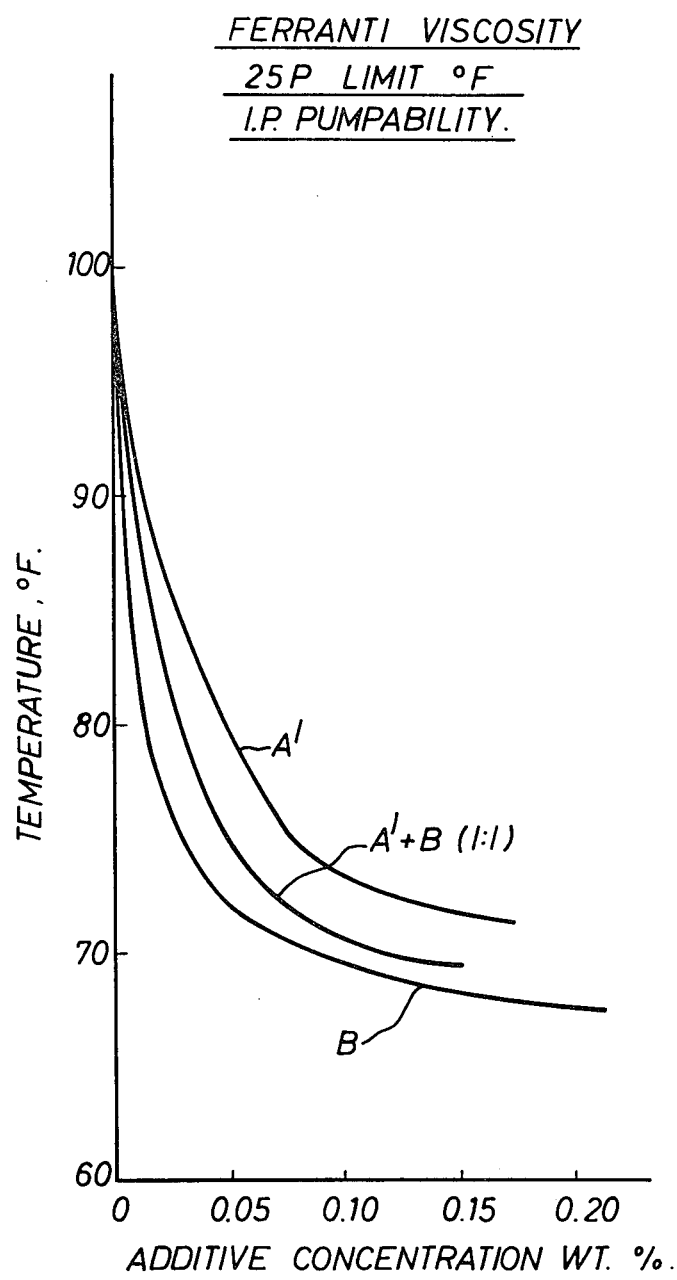

United States Patent [19]

Price

[11] B  4,010,006
[45]  Mar. 1, 1977

[54] FLOW IMPROVERS
[75] Inventor: Roger Charles Price, Wantage, England
[73] Assignee: Exxon Research and Engineering Company, Linden, N.J.
[22] Filed: Oct. 18, 1973
[21] Appl. No.: 407,812
[44] Published under the second Trial Voluntary Protest Program on March 23, 1976 as document No. B 407,812.

Related U.S. Application Data
[63] Continuation of Ser. No. 35,320, May 7, 1970, abandoned.

[30] Foreign Application Priority Data
May 9, 1969    United Kingdom ............ 23776/69

[52] U.S. Cl. .................................... 44/62; 44/70; 44/80
[51] Int. Cl. ............................................ C10l 1/16
[58] Field of Search ............. 44/63, 62, 70, 71, 79, 44/80; 252/56 R, 56 D, 59

[56] References Cited
UNITED STATES PATENTS
3,567,639    3/1971    Aaron et al. ........................ 44/62

FOREIGN PATENTS OR APPLICATIONS
724,569    5/1969    Belgium
1,940,944    3/1970    Germany .............................. 44/62
6,709,453    1/1969    Netherlands ......................... 44/62
6,603,483    9/1967    Netherlands ......................... 44/62

Primary Examiner—Allen B. Curtis
Assistant Examiner—Mrs. Y. H. Smith
Attorney, Agent, or Firm—Frank T. Johmann

[57]  ABSTRACT

Polymer blends suitable as flow improvers for crude oils, comprising a polymer having a plurality of linear paraffinic $C_{18+}$ side chains, and a copolymer of ethylene and an ethylenically unsaturated compound having no such side chains.

1 Claim, 2 Drawing Figures

FLOW IMPROVERS

This is a continuation of application Ser. No. 35,320 filed May 7, 1970, now abandoned.

This invention relates to flow improvers which are particularly suitable for use in residual fuels or crude oils.

Although certain polymers which have been recently developed as flow improvers for waxy fuels, such as residuum-containing fuels and crude oils, are good pumpability improvers, the pour point of the flow improver/fuel blend is not good enough. Surprisingly it has been found that the pour point can be improved by incorporating in the blend certain types of other flow improvers.

According to this invention polymer blends suitable for use as flow improvers in hydrocarbons and other oily media which also give a blend having good pour point comprise at least one polymer type A and at least one polymer type B. The polymer of type A is defined as a polymer having a plurality of substantially linear paraffinic side chains, each chain containing at least 18 carbon atoms which polymers are derived directly or indirectly from the homo- or co-polymerisation of a compound containing an organic group capable of undergoing polymerisation. The side chains in the polymer preferably contain at least 22 carbon atoms.

Examples of the organic group present in the polymerisable compound are carboxylic, anhydride, hydroxyl, amino and olefinic groups. Suitably, at least 25 mole %, and preferably at least 50 mole %, of the compounds from which the polymer is derived contain a substantially linear paraffinic side chain containing at least 18 carbon atoms.

Examples of type A polymers are:

1. Homopolymers or copolymers of compounds having an organic group (e.g. carboxylic, hydroxyl, amino, olefinic) capable of undergoing polymerisation where said organic group is adjacent to a substantially linear paraffinic chain containing at least 18 carbon atoms and preferably at least 22 carbon atoms.

EXAMPLES

Homo- or co-polymers of long chain acrylates, methacrylates, vinyl esters, allyl esters, fumarates, maleates, vinyl ethers, olefins including block copolymers of olefins.

2. Copolymers of (i) at least 25 mole % and preferably greater than 50 mole % of compounds having an organic group (e.g. carboxylic, hydroxyl, amino, olefinic) capable of undergoing polymerisation, where said organic group is adjacent to a substantially linear paraffinic chain containing at least 18 carbon atoms, and preferably at least 22 carbon atoms and (ii) compounds capable of undergoing polymerisation with the compounds of type (i) in which compounds (ii) have an organic group (e.g. carboxylic, hydroxyl, amino, olefinic) adjacent to a hydrocarbyl or a substituted hydrocarbon group having less than 18 carbon atoms, and preferably less than 10 carbon atoms.

EXAMPLES

Copolymers of compound in (1), with short chain compound of same type as in (1), but where the side chain as defined in (1) is absent, e.g. vinyl acetate/behenyl fumarate, methyl methacrylate/behenyl methacrylate, styrene/behenyl maleate.

3. Homopolymers of compounds capable of undergoing polymerisation and which contain an organic group (e.g. a carboxylic, hydroxyl or amino group) reacted with a long chain compound having an organic group (e.g. carboxylic, hydroxyl or amino) capable of reacting with the organic group present in the homopolymer, the organic group in the long chain compound being adjacent to a substantially linear paraffinic chain containing at least 18 carbon atoms, and preferably more than 22 carbon atoms. Suitably, at least 25% and preferably at least 50%, of the organic groups in the homopolymer are modified by reacting with the organic group in the long chain compound.

EXAMPLES a. Polyacrylic acid, polymethacrylic acid, polymaleic anhydride reacted with long chain alcohols, e.g. behenyl alcohol or amines.

b. Polyallyl alcohol reacted with long chain acids, e.g. benhenic acid.

4. A copolymer X obtained by reacting a long chain compound containing an organic group (e.g. hydroxyl, amino or carboxylic) adjacent to a substantially linear paraffinic chain containing at least 18 carbon atoms, (preferably at least 22 carbon atoms), with a copolymer Y obtained by copolymerising a mixture of monomers of which at least 25 mole % and preferably more than 50 mole % contain an organic group capable of reacting with the long chain compound. Preferably at least 50% and more preferably at least 75% of the organic groups in copolymer Y are modified by reaction with the long chain compound.

EXAMPLES a. Copolymers of acrylate or methacrylate esters with acrylic or methacrylic acid subsequently reacted with long chain alcohols, e.g. behenyl alcohol.

b. Copolymers of allyl alcohol with styrene subsequently reacted with behenic acid.

c. Copolymers of olefins such as ethylene, propylene, etc. with maleic anhydride, vinyl acetate/maleic anhydride; or styrene/maleic anhydride copolymers; each copolymer being subsequently reacted with long chain alcohols e.g. behenyl alcohol.

5. Condensation polymers prepared by a condensation reaction, e.g. an esterification involving the elimination of water. Thus, for example, suitable copolymers of this type are prepared by processes in which a compound having one or more carboxyl groups is reacted with a compound having one or more alcoholic hydroxy and/or amino groups, wherein at least one of the compounds has a substantially linear paraffinic chain adjacent to the ester forming group (i.e. —OH or —COOH) which contains at least 18 carbon atoms.

One example of a type A copolymer can be prepared by copolymerising an ester of an ethylenically unsaturated alcohol with an ester of ethylenically unsaturated carboxylic acid, provided at least one of the esters has a substantially linear paraffinic chain containing at least 18 carbon atoms. Suitable esters of unsaturated alcohols include vinyl or allyl esters of $C_1$ to $C_{30}$ monocarboxylic acids, e.g. those of acetic, propionic, butyric, hexoic, dodecanoic, behenic or myristic acids. Particularly suitable esters are vinyl acetate, vinyl propionate or vinyl behenate. Suitable esters of unsaturated carboxylic acids include esters of monocarboxylic acids such as acrylic, methacrylic, oleic or elaidic acids; esters of dicarboxylic acids, such as maleic, fumaric, mesaconic, citraconic, or itaconic acids; or esters of other ethylically polycarboxylic acids, e.g. cis- and trans- aconitic acids.

The mole ratio of the two types of ester can vary but preferably is between 25 to 75 mole % of one ester, and 75 to 25 mole % of the other ester. The esters can be copolymerised by initiation by free radicals generated by the decomposition of peroxides or azo compounds such as benzoyl peroxide and azo-bis-isobutyronitrile or other similar compounds.

Particularly preferred copolymers of this type are copolymers of vinyl acetate with $C_{18}$ to $C_{40}$ alkyl fumarates or maleates, e.g. a copolymer of vinyl acetate and behenyl fumarate ester.

The type A copolymers preferably have a number average molecular weight of between 1000 and 100,000 preferably between 2000 and 20,000.

Another example of a type A polymer is an alkyl or acyl polystyrene in which the alkyl or acyl radical contains at least 18 and more preferably at least 22 carbon atoms. These polystyrenes should also preferably contain 2 to 50 recurring styrene units, and preferably at least half of the styrene units are alkylated or acylated.

Particularly suitable acyl polystyrenes are those in which the acyl group (CRO—) has 22 to 30 carbon atoms, e.g. those derived from behenic acid $CH_3(CH_2)_{20}COOH$. These acyl polystyrenes may be prepared by dissolving styrene in a solvent, e.g. o-di-chlorobenzene and adding to the solution thus obtained 0.5 to 1.0 mole per mole of styrene of an acyl halide/aluminium trihalide complex. (The complex may be prepared by mixing equimolar quantities of the aluminium trihalide e.g. $AlCl_3$, with the acyl halide dissolved in a solvent, e.g. o-di-chloro-benzene, preferably at a temperature of 20° to 70°C.) After all the acyl halide/aluminium halide complex has been added to the styrene solution and hydrogen halide evolution has stopped, the alumium catalyst may be destroyed by the addition of water or alcohol to the reaction mixture. The acylated polystyrene may be taken up in a suitable solvent, e.g. heptane or kerosene.

The ratio of styrene units to acyl units in the polystyrene can vary, e.g. from 1:1 to 2:1 respectively. The number average molecular weight of the acyl polystyrene should preferably be between 1,000 and 25,000 e.g. 8000 to 15,000.

Another suitable class of type A polymers are those prepared by condensing (1) a dicarboxylic acid (suitably with a $C_2$ to $C_6$ linking chain), anhydride or ester thereof (suitably with a $C_1$ to $C_5$ aliphatic alcohol), wherein there is a $C_{18}$ to $C_{44}$ straight chain hydrocarbyl group attached to the carbon chain linking the two carbonyl groups of the acid, anhydride or ester, with (2) an alcohol, amine or hydroxy amine, each having three to at least six hydroxy, primary amino or secondary amino groups, and (3) a mono-carboxylic acid (suitably $C_{12}$–$C_{30}$ hydrocarbyl), provided that if there are only two or three carbon atoms in the carbon chain linking the carbonyl groups of the dicarboxylic acid, anhydride or ester, any amino group in component (2) must be a secondary amino group. Conveniently, reactant (3) is a triol, secondary amine or hydroxyamine, each suitably $C_4$ to $C_{10}$ and preferably $C_4$ to $C_{41}$; or is a trialkanolamine, suitably $C_4$ to $C_{30}$.

In order to prepare the polymer, the three components i.e. (1), (2) and (3) are reacted with one another. Preferably the three components are reacted in equimolar quantities but small variations from equimolar quantities can readily be used, e.g. 0.8 to 1.2 moles of (1) reacted with 0.8 to 1.2 moles of (2) and 0.8 to 1.2 moles of (3).

The molecular weight of the polyesters and polyesteramides should preferably be more than 1000, for example between 1200 and 5000.

Suitable examples of such condensation polymers are described in British Patent Specification No. 1,140,067, especially that prepared by condensing a $C_{30+}$alkenyl substituted succinic anhydride with diethanolamine and a mixture of $C_{20}$–$C_{22}$ fatty acids.

Other suitable type A polymers are those condensation polymers described in the specification of British Patent application 22071/68 now British Pat. No. 1,215,214. Such polymers are obtained by the condensation reaction of (1) a dicarboxylic acid (suitably with a $C_2$ to $C_6$ linking chain), anhydride or ester thereof (suitably with a $C_1$ to $C_5$ aliphatic alcohol), wherein the number of carbon atoms in the chain linking the two carbonyl groups is between one and twelve inclusive, with (2) a polyol containing at least four up to at least six hydroxy groups where all the carbon atoms in the beta position with respect to a hydroxy group must be tertiary carbon atoms, and (3) a monocarboxylic acid; provided that either reactant (1) or reactant (3) has, or both have a carbon-and hydrogen-comprising group also containing at least 8 carbon atoms either attached to one of the carbon atoms in the carbon chain linking the two carbonyl groups in (1) or attached to the carbonyl group of the acid (3).

In order to prepare the polymer, the three components i.e. (1), (2) and (3) are reacted with one another. In the preferred embodiment when the polyol is a tetrol the quantities of the three components are two moles of (3) per mole of (1) and per mole of (2), but variations from these quantities can readily be used, e.g. 0.5 to 1.5 moles of (1) reacted with 0.5 to 1.5 moles of (2) and 1.0 to 3.0 moles (3). The molecular weight of the polymers should preferably be more than 1000, suitably between 1200 and 20,000.

Reactant (1) is preferably a hydrocarbyl (e.g. alkenyl or alkyl) substituted succinic acid or anhydride. Reactant (2) is preferably a tetrol. This may be, for example 1,2,4,5 tetramethylol benzene or a polypentaerythritol, but is preferably pentaerythritol, or a halogenated pentaerythritol. Reactant (3) preferably contains 13 to 31 carbon atoms. For optimum results the carbon- and hydrogen-comprising group substituent in reactants (1) or (3) is, or both are a straight-chain radical, e.g. one having a chain length of between 18 and 44 carbon atoms. The number average molecular weight of these condensation polymers is preferably more than 1000, e.g. between 1200 and 20,000. A particularly preferred condensation polymer is that prepared by condensing a $C_{22}$–$C_{28}$ alkenyl or a $C_{30+}$alkenyl substituted succinic anhydride with pentaerythritol and a mixture of $C_{20}$–$C_{22}$ fatty acids.

In general, type A copolymers are oil-soluble, flow-improving polymers characterised by a hydrocarbon backbone, or an ether or ester-interrupted hydrocarbon backbone, of which at least 25 mole percent of monomer making up said polymer has substantially straight alkyl side chains of 18 to 44, preferably 22 to 30, carbon atoms, which side chains are attached to said polymer backbone, either directly, or indirectly through ester, amide, or ether linkages.

The other component of the polymer blend of this invention is a type B polymer. Such polymers are defined as those copolymers of ethylene and one or more ethylenically unsaturated compounds such that the copolymers contain at least 50 mole %, preferably 82–99 mole %, e.g. 86–97 mole%, of polymerised ethylene units and the remainder contains ethylenically unsaturated compounds having double bond preferably a terminal bond, and in which if there is any substantially linear paraffin chain therein any such chain contains less than 18 carbon atoms, and preferably less than 5 carbon atoms. Examples of such ethylenically unsaturated compounds which may be copolymerised with ethylene are ethylenically unsaturated acids, anhydrides, esters, amines, hydroxy compounds, nitriles, amides, imides or halides. Thus, also included is chlorinated polyethylene containing 10 to 60 wt % chlorine on weight of chlorinated polymer.

The preferred comonomers which may be used in the compositions of the invention are those of the formula $R_1R_2C = CR_3R_4$, where $R_1$ and $R_3$ are hydrogen or $C_1$ to $C_{10}$ hydrocarbyl, preferably alkyl;

$R_2$ is —COOH, —COOR$_5$, —OR$_5$, —COR$_5$, —SR$_5$, —R$_4$ or —R$_5$, where $R_5$ is hydrocarbyl such as alkyl, or alkaryl, provided that any saturated linear side chain present therein contains less than 18 carbon atoms;

$R_4$ is $R_1$, $R_2$, —CONR$_1$R$_3$, —CH$_2$OH, —CN, —CH$_2$NR$_1$R$_3$, halogen, or —NCO.

Suitable ethylenically unsaturated compounds with which ethylene may be copolymerised include 1. carboxylic acids, e.g. acylic acid, methacylic acid, vinyl acetic acid, fumaric acid, maleic acid, and itaconic acid, 2. $C_1$ to $C_9$ esters (especially alkyl) of unsaturated carboxylic acids, e.g. those mentioned above. Such esters include for example methyl, ethyl, butyl (both normal and iso—), hexyl esters of acrylic acid, methacrylic acid, fumaric or maleic acids, 3. amides, imides and anhydrides, e.g. amides, imides and anhydrides (where they exist) of the above mentioned acids.

Thus for example one may use maleic anhydride, acrylamide, maleimide, or itaconamide, 4. unsaturated hydroxy compounds, e.g. alcohols, polyols and phenolic compounds. Thus one may use for example allyl alcohol, but-1-ene-1-ol, hydroxyethyl methacrylate, eicos-4-ene-1-ol, but-2-ene-1, 4-diol, para allyl phenol (chavicol), 5. unsaturated amines and nitriles, e.g. allyl amine, allyl cyanide, 1-amino-but-2-ene, 1-amino-hex-5-ene, dimethylaminoethyl methacrylate, dimethylaminomethacrylate, or acrylonitrile, methacrylonitrile, 6. alkenyl alkyl ethers, styrenes alkenyl halides, unsaturated aldehydes or ketones. Thus one may use for example vinyl methyl ether, vinyl ethyl ether, allyl n-hexyl ether, styrene itself, α-methyl styrene, p-methyl styrene, vinyl chloride (equivalent to chlorinated polyethylene), allyl chloride, acrolein, methyl vinyl ketone, or cinnamaldehyde, 7. unsaturated esters of saturated carboxylic acids, e.g. vinyl or allyl esters of $C_1$ to $C_9$ monocarboxylic acids, for example vinyl acetate, allyl acetate, vinyl butyrate, or isopropenyl acetate, 8. olefins containing a saturated chain of less than 18 and preferably not more than 9 carbon atoms. Suitable olefins include propene, butene-1, butene-2, hexene-1, and styrene. The ethylene/olefin copolymers are preferably prepared using Ziegler catalyst systems, e.g. aluminium triethyl plus titanium trichloride.

Type B copolymers can usually be prepared by polymerisation using a peroxide initiator e.g. di-t-butyl peroxide, as for example described in the specification of the cognate of British patent application 54631/67 and 43254/68, now British Pat. No. 1,242,535, or by Ziegler catalysis in the case of ethylene and compounds of the formula $R_1 R_2C = CR_3R_4$ where $R_1$ to $R_4$ are all hydrocarbyl.

Copolymers B of the type referred to under (7) above can be made as described in U.K. Specification No. 1147904.

Thus one method of preparing the copolymers involves feeding the monomers into a tubular reactor which has been previously purged with nitrogen. A small amount of oxygen, usually 0.005 to 0.05 wt.% based on the weight of ethylene, is also introduced into the reactor. Alternatively a peroxide initiator, e.g. di-t-butyl peroxide, or a mixture of peroxide initiator and oxygen may be introduced into the reactor in place of oxygen alone. A solvent (e.g. benzene, water, saturated hydrocarbons, methanol) may also be employed in the reaction. The pressure is maintained between 60 and 2700 atmospheres (900 and 40,000 p.s.i.g.), preferably between 135 and 2000 atmospheres (2,000 and 30,000 p.s.i.g.). The temperature should be maintained between 40°C and 300°C, preferably between 70°C and 250°C.

As a specific example, a 1 gallon stainless steel magnetically stirred autoclave was charged with 840 ml. of benzene and then purged with nitrogen then with ethylene. The autoclave was then heated to 150°C and pressurised with ethylene to 900 p.s.i.g. 220 g of vinyl acetate was then introduced via a metering pump over a period of 2 hours. Concurrently a solution of 22 g of di-tert butyl peroxide in 66 g of benzene was introduced to the reactor over a period of 3 hours. The temperature was maintained at 150°C and the pressure at 900 p.s.i.g. during the reaction. After the addition of the peroxide was completed the reaction mass was maintained at 150°C and 900 p.s.i.g. for an additional 30 minutes. On completion of the reaction the mixture was cooled and the pressure released. Free solvent and unreacted monomers were removed by stripping to give a copolymer having a number average molecular weight of 2400.

The resulting polymer should contain more than 50 mole % of ethylene, particularly from 82 to 99 mole %, e.g. 86 to 97 mole % of ethylene; and 1 to 18 mole %, e.g. 3 to 14 mole % of the substituted ethylene. Such copolymers preferably have a number average molecular weight of from 1000 to 60,000, e.g. between 4000 and 20,000.

In the polymer blend the ratio of type A to type B polymer can vary and variation in this ratio will often substantially affect the pumpability of the blend when added to the oil or fuel. In general however a weight ratio of between 1:5 and 5:1, e.g. between 1:2 and 2:1, will be found effective.

The polymers are particularly suitable for use in crude oils or relatively heavy fuels. The polymers can be addded to the crude at any stage. Thus, they can be added "downhole", that is to say, to up-flowing crude, at a point in, suitably at the bottom of, a well to prevent or reduce paraffinic deposit on the well-casing. The preferred heavy fuels are of two types. First, residua-containing fuels which are defined as a fuel comprising residua from the distillation at atmospheric pressure of crude oil or shale oil or mixtures thereof. Secondly, "flash distillate fuels" which are defined as those distillate fuels obtained by the flash distillation at reduced pressure of the residues obtained from the distillation of crude oil at atmospheric pressure.

Generally the residua-containing fuel will contain from about 35% to 100% by weight of residua, and will usually have kinematic viscosities ranging from 10 to 3,500 cs at 100°F. However, the viscosity of some particularly waxy fuels may be difficult to measure accurately at 100°F, and it is well known in the art that the viscosity of such fuels is measured by the viscosity at a higher temperature. The viscosity at 100°F is then obtained by extrapolation using a R.E.F.U.T.A.S. viscosity temperature chart. The extrapolated kinematic viscosity will then fall in the desired range at 100°F. The R.E.F.U.T.A.S. temperature viscosity chart was designed by C.I. Kelly, M.Sc. (Tech.), F.I.C., M. Inst.Pet., A.M.I.A.E. Copyright reserved in Great Britain and U.S.A. by Baird and Tatlock (London) Limited, 14–17 Cross Street, Hatton Garden, London E.C. 1.

Fuels having kinematic viscosities of between 15 and 1500 cS at 100°F are preferred, and also fuels wherein at least 60% by weight of the fuel boils above 500°F at atmospheric pressure are particularly suitable.

The fuels to which this invention applies include therefore, light, medium, heavy and bunker or furnace fuels, the viscosities ranging from about 10–3500 cS at 100°F, but usually, however, the maximum viscosity wil be about 1500 cS at 100°F. Examples of suitable fuels are described in Pt 3 Industrial and Marine Fuels of BS 2869 : 1957.

Crude oils from which the fuels are derived may also be used.

The polymer blend may be added to crude oil or heavy fuel, preferably in a proportion from 0.0001 wt.% upward, e.g. between 0.0001 and 10%, desirably between 0.001% and 10% by weight, especially between 0.01% and 1.0%, more especially between 0.02 to to 0.4%, e.g. about 0.3% by weight based on the fuel.

Of course, in all cases the two or more polymers comprising the polymer blend may be added separately to the oil or fuel rather than being blended together first.

The oil or fuel may of course contain other additives, e.g. antifoulants, desalting chemicals or combustion improving additives etc.

EXAMPLE 1

Two copolymers were prepared:

Type A — a copolymer of (1) a $C_{30+}$alkenyl succinic anhydride (ASA), (2) pentaerythritol and (3) a mixture of $C_{20}$–$C_{22}$ fatty acids. This copolymer having a number average molecular weight of about 2500 was prepared by reacting the raw materials together at 200°C for 6 hours with distillation of the eliminated water. The mole ratio (1): (2):(3) was 1.45:1.0:1.9. The ASA was prepared by reacting maleic anhydride with an —olefin of MW about 650 ($C_{30+}$) prepared by polymerisation of ethylene.

Type B — a random copolymer of 72 wt.% ethylene and 28 wt.% vinyl acetate having a number average molecular weight of about 20,000. This was prepared by copolymerisation of ethylene and vinyl acetate at a pressure of about 20,000 p.s.i. using oxygen as initiator. The techniques employed were those known for E/VA copolymerisation. One suitable commercially available ethylene-vinyl acetate copolymer is known by the trade name "Elvax."

The two copolymers A and B, blended together were added at 0.10 wt.% and 0.05 wt.% concentration to a residuum-containing fuel, Libyan Residuum, having the following characteristics:

| | | |
|---|---|---|
| Upper Pour point | 105°F | |
| F.V.T. | 710°F | |
| Kinematic viscosity | 140°F | 118.3 cS |
| | 210°F | 24.03 cS |

Also for comparison copolymer A alone and copolymer B alone were added to the Libyan Residuum, in each case at a concentration of 0.15 wt.%

The following Table I shows the results obtained:

| Copolymer A | Copolymer B | Upper Pour Point °F[1] | 25 Poise Ferranti Viscosity Limit Temperatures °F.I.P. Pumpability[2] |
|---|---|---|---|
| nil | nil | 105 | 95 |
| — | 0.15 wt.% | 90 | 73 |
| 0.15 wt.% | — | 60 | 78 |
| 0.10 wt.% | 0.05 wt.% | 57 | 74 |

[1]The upper pour point was determined by the Institute of Petroleum Method 15/67.
[2]The 25 Poise Ferranti Viscosity Limit was determined by the method described in J.Inst.Pet. March 1966. The limit was measure in °F, the limit being the temperature °F at which the viscosity of the sample was 25 Poise. The viscosity is the Institute of Petroleum's pumpability —"I.P. Pumpability".

EXAMPLE II

In this example copolymers A and B as prepared by the methods described in Example I were used together with two other copolymer A′ and A″.

A′— a type A copolymer of equal molar proportions vinyl acetate and benhenyl fumarate having a number average molecular weight of 20,000. This was prepared by polymerisation using a benzoyl peroxide initiator.

A″ — a Type A polymer, i.e. on acylated polystyrene having a number average molecular weight of about 10,000, and prepared from behenic acid in the manner previously described.

Blends of B with either A, A′ or A″ were added to the same Libyan Residuum as described in Example I. For comparison purposes the four copolymers A, B, A′ and A″ were added separately to the Libyan Residuum. The results obtained were as follows:

TABLE II

| Additive | Concentration % wt. | Upper Pour Point °F | 25 Poise Ferranti Viscosity Limit I.P. Pumpability °F |
|---|---|---|---|
| nil | — | 105 | 98 |
| B | 0.02 | 92 | 76 |
| | 0.05 | 90 | 72 |
| | 0.15 | 90 | 68 |
| A′ | 0.02 | 92 | 81 |
| | 0.05 | 60 | 82 |
| | 0.15 | 53 | 76 |
| A″ | 0.02 | 91 | 86 |
| | 0.05 | 54 | 76 |
| | 0.15 | 39 | 77 |
| A | 0.05 | 95 | 80 |
| | 0.10 | 60 | 80 |
| | 0.15 | 60 | 80 |
| B + A′ (1:1) by wt. | 0.02 | 96 | 78 |
| | 0.04 | 74 | 78 |
| | 0.06 | 59 | 74 |
| | 0.08 | 54 | 72 |
| B + A′ (1:2) by wt. | 0.025 | 90 | 76 |
| | 0.05 | 61 | 76 |
| | 0.09 | 50 | 71 |
| B + A″ (1:4) | 0.025 | 73 | 74 |

TABLE II-continued

| Additive | Concentration % wt. | Upper Pour Point °F | 25 Poise Ferranti Viscosity Limit I.P. Pumpability °F |
|---|---|---|---|
| by wt. | 0.063 | 48 | 68 |
| | 0.10 | 45 | 69 |
| B + A″ (1:2) by wt. | 0.063 | 36 | 68 |
| A + B (1:1) by wt. | 0.04 | 92 | 84 |
| | 0.08 | 94 | 75 |
| | 0.16 | 42 | 70 |
| A + B (4:1) by wt. | 0.0125 | 96 | 88 |
| | 0.025 | 98 | 82 |
| | 0.05 | 91 | 78 |
| | 0.075 | 54 | 75 |
| A′ | 0.02 | 85 | 66 |
| | 0.05 | 65 | 66 |
| | 0.10 | 50 | 60 |
| B | 0.02 | 90 | 68 |
| | 0.04 | 85 | 64 |
| | 0.15 | 46 | 59 |
| A′ + B (1:1) by wt. | 0.02 | 43 | 62 |
| | 0.03 | 54 | 60 |
| | 0.05 | 41 | 59 |
| | 0.08 | 47 | 51 |
| A | 0.05 | 82 | 70 |
| | 0.10 | 52 | 67 |
| | 0.15 | 44 | 67 |
| B + A (1:4) by wt. | 0.0125 | 82 | 64 |
| | 0.025 | 82 | 66 |
| | 0.05 | 54 | 63 |
| | 0.075 | 47 | 62 |

It can be seen that in general, optimum properties with minimum quantity of additive are obtained when copolymer B is combined with one of the polymers A, A′ or A″. This is illustrated with respect to B and A′ in 1:1 wt. ratio on the two graphs of the drawing. For reference to "I.P. Pumpability" vide I.

EXAMPLE III

Blends similar to those of Example II were prepared using copolymers A, B and A′. These blended were added to a North African heavy residual fuel oil having the following characteristics:

| | | |
|---|---|---|
| Upper pour point | | 91°F |
| Kinematic Viscosity at | 140°F | 67.8 cS |
| | 210°F | 14.93 cS |

The results obtained were as follows:

| Additive | Concentration % wt. | Upper Pour Point °F | 25 Poise Ferranti Viscosity Limit I.P. Pumpability °F |
|---|---|---|---|
| nil | — | 91 | 92 |

Once again it can be seen that in general, optimum results with minimum quantity of additive are obtained when copolymer B is combined with either of polymers A or A′.

We claim:
1. A fuel oil comprising 35 to 100 wt. % residue from the distillation of crude oil which is improved in its flow properties by containing in the range of about 0.01 to about 1 wt. % of a synergistic flow improving combination of a polymer blend comprising: a first polymer which is an oil soluble flow improving copolymer of ethylene and vinyl acetate having a molecular weight in a range of about 1000 to about 60,000 and containing about 86 to 97 mol % of ethylene; in combination with a second oil soluble flow improving polymer which is acyl polystyrene having a number average molecular weight in the range of 1000 to 25,000 and wherein at least half of said styrene units are acylated with $C_{22}$–$C_{30}$ straight chain acyl groups; and wherein the weight ratio of said second polymer to said first polymer is in the range of about 5:1 to 1:5, said synergistic combination in said oil giving a pour point improvement greater than a like amount of either said first or second polymer alone.

* * * * *